Figure 1:
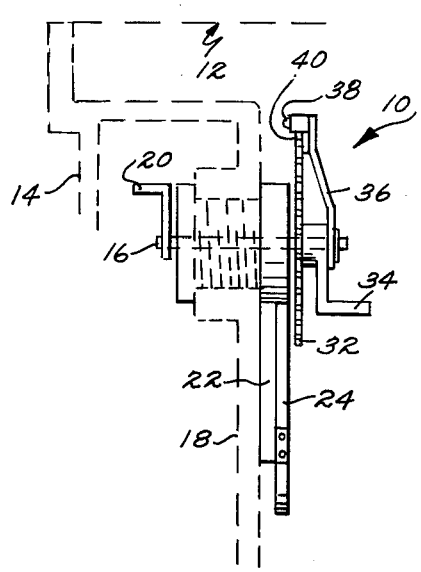

Nov. 9, 1965 G. D. GREEN 3,216,253
METER INDEX COMPENSATOR
Filed Feb. 21, 1962 2 Sheets-Sheet 1

INVENTOR.
Graydon D. Green
BY Cushman, Darby &
Cushman
ATTORNEYS

Nov. 9, 1965                G. D. GREEN                3,216,253
                        METER INDEX COMPENSATOR
Filed Feb. 21, 1962                                 2 Sheets-Sheet 2

INVENTOR.
Graydon D. Green
BY Cushman, Darby &
Cushman
ATTORNEYS 3,216,253
METER INDEX COMPENSATOR
Graydon D. Green, Russellville, Ark., assignor, by mesne assignments, to Rockwell Manufacturing Company, Pittsburgh, Pa., a corporation of Pennsylvania
Filed Feb. 21, 1962, Ser. No. 174,832
6 Claims. (Cl. 73—233)

This invention relates generally to a device for measuring and registering the flow of gases and more particularly to an improved apparatus for compensating for the effects of variables, e.g., temperature and pressure of the gas passing through a conventional meter.

In the commercial sale of natural or manufactured gas it has been customary to provide meters which indicate the amount of gas which has been consumed by a user. The amount of gas flow which is indicated by a meter, however, varies not only in terms of the actual amount of flow of the gas, but also as a function of the ambient pressure and temperature. As a result, it has not been uncommon for a meter to indicate that a certain amount of gas flow has passed in one day and that an entirely different amount has passed in another day, even though the actual amount of flow on each of these days was of an equal amount. Commercially, of course, this is most undersirable, and in the past various attempts have been made to compensate for the changes in the gas flow readings which occur from day to day as a result of variations in the temperature and pressure.

As a partial attempt to overcome this phenomenon, gas meters are usually located in the basement of a house or building where the temperature is not apt to vary to the degree that it would in the house proper or out-of-doors. Additionally, various mechanisms have been devised and employed to compensate for these variations, but these have tended to be of a rather complex nature and are necessarily expensive in their manufacture.

Accordingly, it is an object of the present invention to provide new and improved apparatus to compensate for the effects of variables, especially temperature and pressure.

Another object of the present invention is the provision of compensating mechanisms for use in combination with a utility meter which is of uncomplicated design and inexpensive to manufacture.

A further object of the present invention is the provision of compensation mechanisms for use in a utility meter which includes a mechanism for driving the dials of the meter and a mechanism which periodically interrupts movement of the driving means dependent upon a predetermined movement of temperature or pressure responsive means.

Still another object of this invention is to provide a compensation mechanism having means to interrupt the movement of the dials of a utility meter, the interrupting means, including a cam member associated with temperature responsive means, the cam member increasing in width transverse to the direction of movement of the temperature responsive means in response to a change in temperature, and a cam follower associated with the driving means which, upon engagement with the cam member serves to terminate movement of the driving means.

Other and further objects of this invention will become apparent in the description which follows when taken with the accompanying drawings, in which like numerals refer to like parts throughout.

Figure 2:
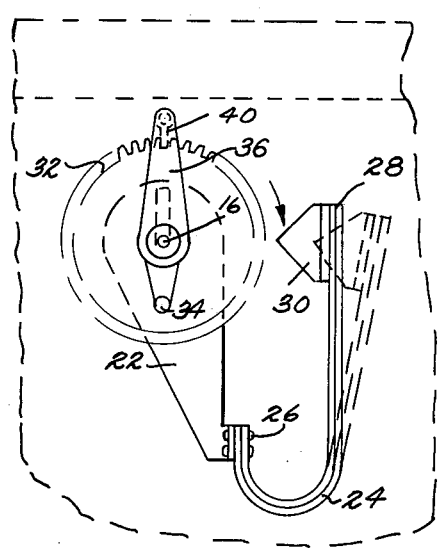
Figure 3:
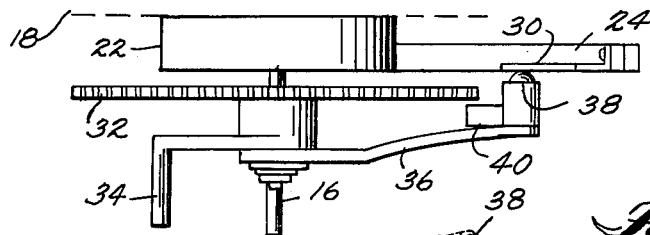
Figure 4:
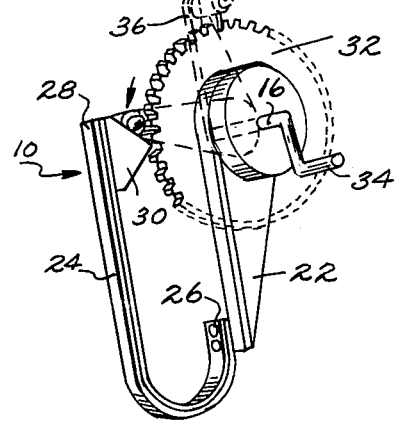
Figure 5:
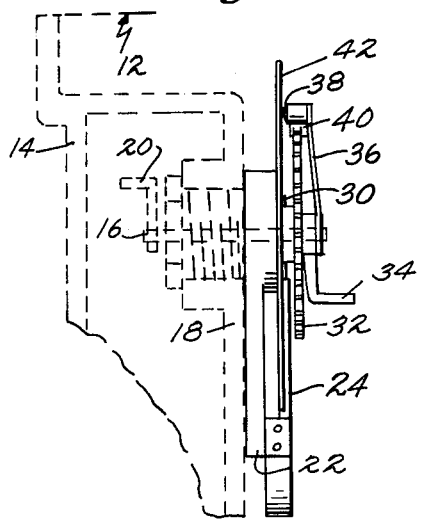
Figure 6:
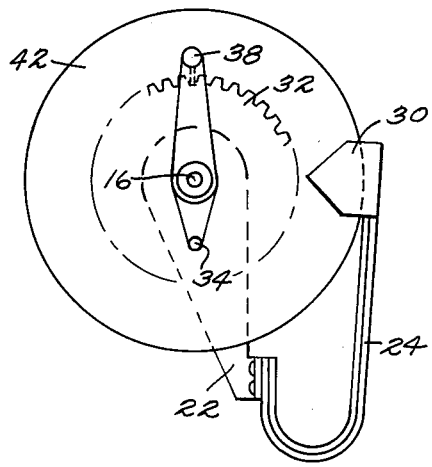
Figure 7:
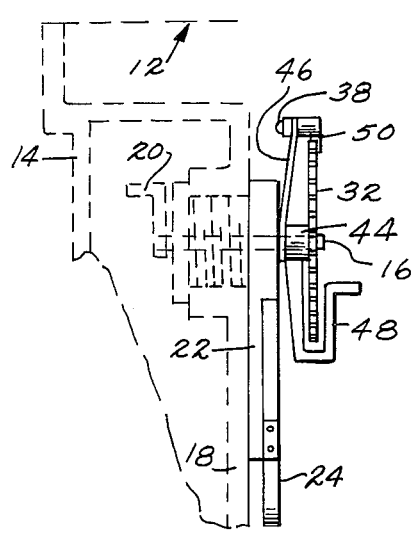
Figure 8:
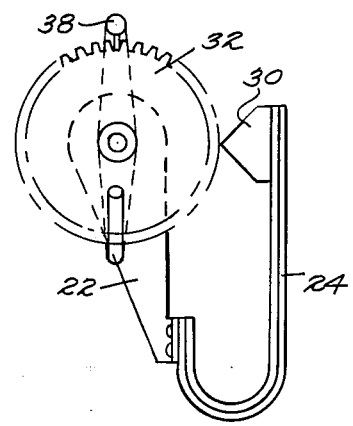

In the drawings:
FIGURE 1 is a side elevation view of a preferred embodiment of the compensating mechanism disclosed herein associated with a conventional utility meter;
FIGURE 2 is a front elevation view of the mechanism illustrated in FIGURE 1;
FIGURE 3 is a top plan view of the mechanism illustrated in FIGURES 1 and 2 and showing the cam follower in engagement with the cam such that movement of the driving mechanism is momentarily terminated;
FIGURE 4 is a view in perspective more clearly showing the mechanism illustrated in FIGURES 1, 2 and 3;
FIGURE 5 is a side elevation view of a modification of the compensation mechanism providing positive breaking apparatus;
FIGURE 6 is a front elevation view of the mechanism illustrated in FIGURE 5;
FIGURE 7 is yet another embodiment of the invention whereby frictional drag on the driving mechanism is reduced; and,
FIGURE 8 is a front elevation view of the FIGURE 7 embodiment.

Referring with more particularity to FIGURE 1 of the drawings, there is generally shown at 10 an illustrative mechanism of this invention which is intended to adjust the index dial reading of a gas meter in order to compensate for the effects of variables, such as temperature and pressure. This mechanism may also be used as a fixed ratio device in connection with the calibration of utility meters.

The body of a gas meter is partially indicated at 12 in phantom and includes an index box 14 within which is located an "index" mechanism (not shown) which has the usual series of dial pointers suitably geared to one another in a conventional manner to provide readings of the volume of gas, generally in terms of cubic feet, which has passed through the meter. A shaft 16 is mounted for rotation on the rear wall 18 of the index box and extends a substantial distance to either side thereof. To the end of the shaft 16 which terminates within the index box 14 there is fixed an index drive dog 20 which serves to engage and to drive the index mechanism (not shown).

Suitably secured to the rear wall of the index box is a bracket 22 which has connected thereto a temperature responsive means 24, in the form of a bi-metal strip. This latter mentioned means is of U-shaped form and is secured at one end to a flange on the bracket member 22 as by rivets 26 or other type connecting means. With this form of construction, temperature variations will cause the length of each of the two metal strips to vary by different amounts according to the differing coefficients of expansion of the metals. The means 24 will therefore be caused to move toward or away from the bracket member 22 in accordance with an increase or decrease of temperature. Fixed to the end 28 of the bi-metallic strip 24 is a member 30 having a cam surface formed thereon. The surface of the cam member 30 is generally triangular in shape, its cross section increasing with increasing distance away from the bracket member 22.

Fixed to the shaft 16 is a gear member 32 which together with the shaft and the index drive dog 20 serves as means for driving the meter dials, and mounted for rotation on the shaft 16 is a dog 34 to which is secured a leaf spring 36. Adjacent the tip of the leaf spring a cam follower 38 is fastened which may be a rotatable ball or other suitable following means. Adjacent the cam follower 38 is a finger member 40 which is usually biased into position between a pair of teeth, a plurality thereof formed about the periphery of the gear 32.

A conventional type of motor (not shown) which is driven in response to the gas flowing through the meter serves to drive the dog 34 and therefore also the indicating dials located in the index box 14. When the finger member 40 adjacent the tip of the leaf spring 36 is in engagement with the gear 32, rotation of the dog 34 is transmitted through the shaft 16 to the dog 20 which, in turn operates the index dial mechanism. At one point for every revolution of the dog 34, the ball follower 38 will be caused to engage a cam plate 30 and will ride thereon for a distance dependent upon the position of the bi-metal strip 24 relative to the bracket 22 as is evident from FIGURE 2. The follower will be in engagement with the cam member 30 for a longer period of time the closer the cam member 30 is to the bracket member 22.

When the follower 38 is in engagement with the cam member 30 as is most readily seen in FIGURE 3, the finger member 40 is moved out of engagement from the teeth or gear 32. Since rotation of the dog element 34 is transmitted to the dog element 20 through the spring member 36, finger 40 and gear 32, movement of the finger 40 out of engagement with the gear 32 will terminate rotation of the shaft 16 and therefore also of dog element 20. Movement of the index dials will then be terminated for the duration that the follower 38 remains in engagement upon the surface of the cam member 30. While it might be preferable to employ a gear 32 having 100 teeth formed thereon such that each tooth represents a one percent correction, it is to be understood that a gear might be employed having any desired number of teeth.

It is further to be understood that a pressure sensitive element such as a bellows could be substituted for the bi-metal strip 24 in order to compensate for pressure changes. Also, combination pressure and temperature compensating devices may be employed in place of the bi-metal strip 24 shown in the drawings in order to simultaneously compensate for pressure and temperature.

While employing the mechanism referred to in FIGURES 1-4, it is possible that during that period of time in which the finger 40 is held out of engagement from the teeth on the gear 32, rotation of the dog element 34 may yet be partially transmitted to the dog 20 because of frictional interaction between the dog 34 and the shaft 16. Although the interaction therebetween would probably be slight, it might be well to avoid this possible error by employing one or the other of the modified mechanisms shown in FIGURES 5, 6, 7 and 8.

With reference to FIGURES 5 and 6 there is illustrated such a modified compensating device similar to that shown in FIGURES 1-4 and differing only in the addition of a circular plate or disk 42 which is secured to the gear 32 on the opposite side of the cam 30 from follower 38. The purpose of the disk is to insure that during the period that the finger member 40 is biased out of engagement from the teeth or gear 32, movement of the gear will be positively braked. The manner in which this is accomplished is as follows. When the follower 38 engages the surface of the cam member 30, the opposite side of said cam member from that engaging said follower will be moved into engagement with the disk 42 as permitted by strip 24. This positive engagement by the cam member 30 on the surface of the disk will prevent rotation of the disk and therefore also of the gear 32 secured thereto, and thus provides a positive braking action on the shaft 16 and dog member 20. With the gear 32 thus rigidly held stationary, the shaft 16 fixed thereto and the dog 20 also remain stationary while the dog 40 is held disengaged from the gear teeth.

A second modification of the invention is shown in FIGURES 7 and 8, which, as in the modification of FIGURES 5 and 6, serves to prevent the frictional interaction between the dog element and the shaft. In this instance the spring member is fixed to a stub bearing 44 positioned between the leaf spring 46 and gear 32 thereby substantially eliminating frictional drag on the system, that is to say, frictional interaction between the dog member 48 and the shaft 16. During operation of this modified device, as the follower 38 moves into engagement with the cam 30, the leaf spring 46 is urged toward the gear 32 thereby disengaging the finger 50 from the teeth of the gear. In all other ways this modified form of compensating mechanism operates similarly to the embodiment of FIGURES 1-4.

While the form of apparatus described herein constitutes preferred embodiments of the invention, it is to be understood that the invention is not limited to these precise forms of apparatus, but that various changes may be made therein without departing from the scope of the invention as is defined in the respective appended claims.

What is claimed is:

1. A gas meter index drive mechanism embodying means compensating for changes in gas temperature comprising relatively rotatable drive transmitting means connected respectively to be driven by said meter in response to gas flow through the meter and to actuate said index and adapted when operably engaged to drive the index from said meter, temperature responsive means operably connected to automatically proportionately vary the drive ratio between said drive transmitting means by interrupting said drive engagement periodically during each revolution, and means directly actuated by said drive interrupting means for positively braking said drive transmitting means to the index only during said drive interruption.

2. A gas meter index drive mechanism embodying means compensating for changes in gas temperature comprising toothed motion transmitting members relatively rotatably mounted and operably connected respectively to be driven by a meter and to drive an index, resilient means biasing said member driven by the meter into toothed drive engagement with the other member, and cam means positioned in response to changes in gas temperature for directly engaging the member driven by the meter and displacing it to periodically interrupt said drive engagement, and means for positively braking rotation of the member connected to said index only during said drive interruption comprising means defining a braking surface rotatable with said member driving the index, and said cam means being located to be moved into frictional engagement with said surface when it directly engages said member driven by the meter to effect said braking of the member driving the index during drive interruption.

3. In a gas meter index drive mechanism comprising a rotatable shaft connected to actuate the index, a toothed member non-rotatably mounted on said shaft, a drive member connected to be driven from the meter rotatably mounted concentrically with said shaft adjacent the toothed member and comprising a leaf spring carrying a toothed element normally drivingly engaged with said toothed member, a cam follower on said spring, a flexible bimetallic element anchored at one end and having a free end on which is mounted a cam, said cam being positioned to extend into engagement with said follower and periodically displace said toothed element out of drive engagement with said toothed member for a predetermined time during each revolution of said drive member upon predetermined flexure of said bimetallic element in response to the temperature of the gas being metered.

4. A gas meter index drive mechanism embodying means compensating for changes in gas temperature comprising a rotatable drive member adapted to be rotated from the meter and comprising a radially extending spring arm carrying a toothed element and an axially projecting cam follower, driven means for actuating the index comprising a rotatable gear coaxial with said drive member, said spring arm normally urging said toothed element into drive engagement with said gear and said cam follower projecting to the other side of said gear, and a flexible bimetallic element anchored at one end and having a free end on which is mounted a cam, said cam being positioned at said other side of said gear to extend into engagement with said follower and periodically displace said toothed element out of drive engagement with said gear and interrupt drive to said driven member.

5. In a gas meter index drive mechanism comprising a rotatable shaft connected to actuate the index, a toothed member non-rotatably mounted on said shaft, a drive member connected to be driven from the meter rotatably mounted concentrically with said shaft adjacent the toothed member and comprising a leaf spring carrying a toothed element normally drivingly engaged with said toothed member, a cam follower on said spring, a flexible bimetallic element anchored at one end and having a free end on which is mounted a cam, said cam being positioned to extend into engagement with said follower and periodically displace said toothed element out of drive engagement with said toothed member upon predetermined flexure of said bimetallic element, and means defining a friction surface rotating with said toothed element, said cam being positioned in engagement with said friction surface during drive interruption to positively brake rotation of said member driving said index.

6. A gas meter index drive mechanism embodying means compensating for changes in gas temperature comprising a rotatable drive member adapted to be rotated from the meter and comprising a radially extending spring arm carrying a toothed element and an axially projecting cam follower, driven means for actuating the index comprising a rotatable gear coaxial with said drive member, said spring arm normally urging said toothed element into drive engagement with said gear and said cam follower projecting to the other side of said gear, a flexible bimetallic element anchored at one end and having a free end on which is mounted a cam, said cam being positioned at said other side of said gear to extend into engagement with said follower and periodically displace said toothed element out of drive engagement with said gear and interrupt drive to said driven member, and means providing an axially facing braking surface on said driven means engaged by said cam during said drive interruption.

References Cited by the Examiner

UNITED STATES PATENTS

| | | | |
|---|---|---|---|
| 1,887,254 | 11/32 | Young | 73—206 |
| 2,689,684 | 9/54 | Laternser | 235—61 |
| 2,886,969 | 5/59 | Dufour | 73—233 |

FOREIGN PATENTS 567,158   12/58   Canada.

RICHARD C. QUEISSER, *Primary Examiner.*

ROBERT L. EVANS, *Examiner.*